UNITED STATES PATENT OFFICE.

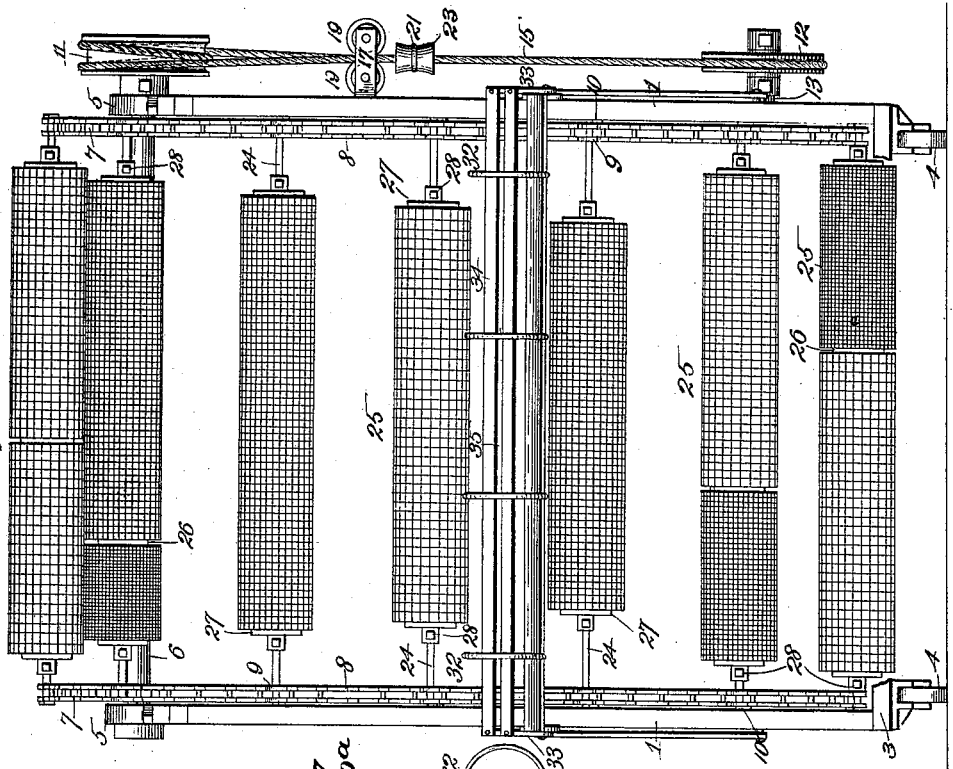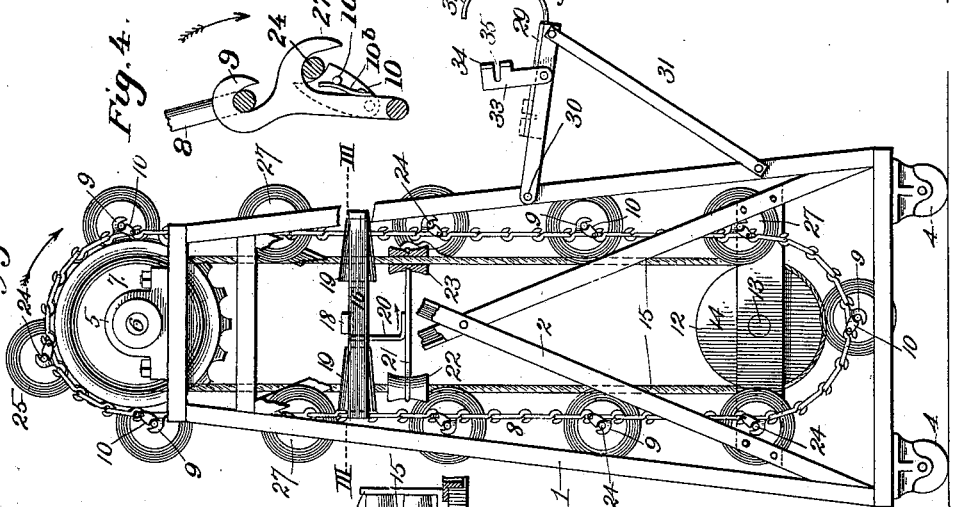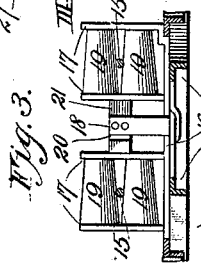

FREDERICK E. WILLITS, OF NEW YORK, N. Y.

WIRE NETTING OR CLOTH HOLDER.

SPECIFICATION forming part of Letters Patent No. 614,196, dated November 15, 1898.

Application filed April 7, 1898. Serial No. 676,754. (No model.)

*To all whom it may concern:*

Be it known that I, FREDERICK E. WILLITS, of New York, State of New York, have invented certain new and useful Improvements in Wire Netting or Cloth Holders, of which the following is a specification.

My invention relates to wire netting or cloth holders—that is to say, to that class of devices for supporting large rolls of material of the types mentioned in such a manner that a predetermined portion may be severed without removing the roll, or the roll be removed and replaced easily and quickly.

The invention consists in certain novel and peculiar features of construction and combinations of parts, and the general nature, object, and scope of the same appears in following description and the appended the claim.

In order that the invention may be fully understood, reference is to be had to the accompanying drawings, in which—

Figure 1 represents a side elevation, partly broken away, of a wire netting or gauze holder embodying my invention. Fig. 2 represents a front view of the same. Fig. 3 represents a horizontal section taken on the line III III of Fig. 1. Fig. 4 is a detail section of the chain-carrier as viewed from the inner side.

In the said drawings, where like reference-numerals designate corresponding parts, 1 designates a pair of frames of skeleton construction and pyramidal form, and said frames are strengthened by intersecting diagonal braces 2, preferably. The frames are connected at their lower corners by transverse bars 3 and are mounted upon rollers 4 in order that the device may be conveniently shifted from one position to another. They are provided at their upper ends with boxes 5, in which is journaled the transverse shaft 6, said shaft thereby forming a connection between the upper ends of the frames, and mounted rigidly upon said shaft at the inner sides of the frames are sprocket-wheels 7, engaged by endless chains 8, pendent from said wheels. Said chains are provided at suitable intervals with integrally-formed hooks 9 and pivoted dogs 10. These dogs are provided with pins 10ª, projecting, by preference, from their inner sides and pressed constantly outward by the springs 10ᵇ, secured to the chain-links. Mounted upon one end of said shaft is a pulley 11, and vertically below the same is a pulley 12, journaled upon a shaft 13, projecting from a cross-bar 14, secured to the frame, as indicated in Fig. 1, or in any other suitable manner. An endless cable or rope 15 connects said pulleys, and in order to obtain the requisite grip to rotate the same when pulled longitudinally it is turned around pulley 11 preferably twice, as shown. At a suitable point a horizontal cross-bar 16 is secured in any suitable manner to the frame, and said bar is provided with the outwardly-projecting parallel arms 17 and the arm 18, arranged about centrally between the inner arms 17.

A pair of conical rollers 19 are journaled between each pair of arms 17 and at opposite sides of the vertical strands of the cable 15, and normally grip said cable with sufficient power to prevent rotatable action of the shaft 6.

A spring 20, pendent from arm 18, carries a cross-arm 21 at its lower end, to which are secured the tubular handles 22 and 23, respectively, and said handles are forced by the power of said spring to press the cables toward the narrow ends of the wedge-shaped spaces between said rollers 19, as shown clearly in Fig. 3, in order that it will be necessary before the shaft can be rotated to grasp one of said handles and pull it against the resistance of spring 20 until the strands of said cable are relieved of the grip of the rollers 19. If the weight upon the opposite sides of the shaft be unequal, the shaft will now rotate automatically; but if the weight be about equal the operator with his other hand can pull down upon either rope and rotate the shaft in one direction or the other, as the case may be. If the weight be unequal and the tendency of the shaft to rotate is contrary to the operation desired, he can, by pulling upon said rope, overcome the weight, or if the tendency of the shaft is to rotate in the direction desired then he can retard such action either by grasping the rope with his hand or by pressing said ropes with sufficient friction against the rollers 19, as will be understood. It will thus be seen that I have produced a means whereby the shaft may be rotated in either direction or arrested at any particular point—in other words, a handle to operate the machine and a brake mechanism to automatically arrest its movement.

24 designates shafts, which are journaled at their opposite ends in hooks 9 of the carrying-chains or conveyer and are engaged at their opposite sides by pivoted dogs 10, which reliably hold the shafts in engagement with said hooks when the latter are disposed downwardly, as indicated at the right-hand side of Fig. 1, said dogs being of such form and arrangement that the greater the weight upon it the more reliably it will hold the shaft in position, as will be readily understood. Said dogs are spring-actuated, because as the shafts travel from the feather to the head of the arrow, Fig. 1, and in the direction indicated by the same the tendency of the dogs would not alone reliably hold the shafts in position, but being actuated by springs they prevent the dislocation of said shafts. Mounted upon said shafts, in different styles and grades of mesh, are rolls 25, of wire-netting or wire-cloth. The distance between the endless chains is sufficient to receive netting or cloth of the greatest width manufactured in order that the capacity of the holder may be increased by mounting upon some of the shafts two or more rolls of narrow width and of different types, if desired. By this arrangement if the holder is of sufficient size rolls of wire-netting and of wire-cloth of every width and kind manufactured may be supported in such manner that they are open to inspection by the purchaser without inconvenience or waste of time and with a great economy of space, as a device of this kind will not occupy one-third the space taken up by a large number of rolls of wire netting or cloth.

In order that a predetermined length of cloth may be conveniently cut from either roll, I employ a table 29, which is pivoted, as at 30, to the framework at a suitable point and is supported at its opposite ends by braces 31, and secured at their lower ends to the outer end of said table are a series of semicircular guide-rods 32, which cause the cloth as it is shoved outwardly upon the table to bend back upon itself, so that it can be conveniently rolled up.

33 designates a pair of arms pivoted to the sides of the table, and 34 transverse bars connecting the same and provided with a slot 35 between them. After the requisite quantity of netting or cloth has been unwound from the roll the swinging frame just described is thrown down to the position indicated by dotted lines, Fig. 1, so as to clamp the cloth tightly between it and the table. A knife can then be drawn through the guide-slot 35 to sever the unwound portion from the roll. The clamp is then raised and the severed portion is removed.

It is preferable to employ curved arms 32 in lieu of a single guide, as the space between them gives opportunity for conveniently grasping the wire in unwinding the roll or in rolling the unwound portion up, and it will be understood, of course, that they will be sufficiently close together to provide a bearing for netting or cloth of the narrowest width manufactured.

It will frequently happen that the weight at opposite sides of the center of gravity will become unequal, and this cannot be provided for in advance, because it is impossible to tell just how much wire from any one roll will be sold and when. It is therefore obvious that a brake mechanism is very desirable; otherwise the heavy rolls would always be at the bottom and would have to be elevated each time a purchase was made from a roll which did not happen at the time to be contiguous to the table.

From the above description it will be apparent that I have produced a holder for wire netting or cloth rolls which will be found of the utmost convenience to those engaged in handling such material; and it is to be understood, of course, that changes in the form, proportion, detail construction, and arrangement of parts or the substitution of equivalents may be resorted to without departing from the spirit and scope of my invention.

Having thus described the invention, what I claim as new, and desire to secure by Letters Patent, is—

A holder for wire netting or cloth, comprising a suitable framework, a shaft mounted therein, sprocket-wheels upon said shaft, a conveyer, comprising a pair of endless chains, mounted upon said sprocket-wheels, a series of shafts connecting and carried by said chains, and carrying rolls of wire cloth or netting, a pulley or drum upon said shaft, an endless cable frictionally engaging said drum, and suitably guided at its opposite end, a brake mechanism to prevent the movement of said conveyer, comprising conical rollers engaging each strand of the cable, tubular handles upon the cable and connected together, and a spring for causing said handles to press the strands of the cable tightly between said conical rollers, substantially as described.

In testimony whereof I affix my signature in the presence of two witnesses.

FREDERICK E. WILLITS.

Witnesses:
F. S. THRASHER,
M. R. REMLEY.